United States Patent [19]

Moore

[11] Patent Number: 5,482,140

[45] Date of Patent: Jan. 9, 1996

[54] BOARD INVERTER FOR USE IN LUMBER PROCESSING MACHINE

[76] Inventor: Stuart G. Moore, P.O. Box 338 - 505 Upper Bayview Rd., Lions Bay, British Columbia, Canada, V0N 2E0

[21] Appl. No.: 382,159

[22] Filed: Feb. 1, 1995

Related U.S. Application Data

[62] Division of Ser. No. 26,768, Mar. 5, 1993, Pat. No. 5,412,220.

[51] Int. Cl.$^6$ ................................................. B65G 47/24
[52] U.S. Cl. ............................................ 198/403; 198/402
[58] Field of Search ................................... 198/402, 403, 198/413, 416

[56] References Cited

U.S. PATENT DOCUMENTS

| | | | |
|---|---|---|---|
| 2,000,292 | 5/1935 | Miller | 198/403 X |
| 3,247,963 | 4/1966 | Fehely | 198/403 X |
| 3,887,066 | 6/1975 | Houtsager | 198/403 |
| 4,936,437 | 6/1990 | Gearhart | 198/403 |
| 5,143,197 | 9/1992 | Saver | 198/403 X |
| 5,341,910 | 8/1994 | Saver | 198/403 |

FOREIGN PATENT DOCUMENTS

| | | | |
|---|---|---|---|
| 0242819 | 10/1988 | Japan | 198/402 |
| 0269901 | 5/1971 | U.S.S.R. | 198/402 |

*Primary Examiner*—James R. Bidwell
*Attorney, Agent, or Firm*—Adrian Zahl

[57] ABSTRACT

A rotary board inverter is provided for use in a conveyor for a lumber processing machine, with the motive force to invert the boards being provided by the forward motion of the boards themselves as they are transported along the conveyor. The device comprises a rotatable hub with regularly spaced, co-planar arms radiating outwardly from the hub. Each of the arms incorporates a board retainer adapted to sequentially receive boards from the board transporter of the conveyor; to releasably retain a board as the arm rotates about the hub; and to redeposit the now-inverted board on the conveyor downstream of the inverter. Rotation of the device is driven by the forward movement of the boards as they sequentially engage the inverter. The inverter is particularly adapted for use in a conveyor having an array of evenly spaced, longitudinally-displaceable lugs extending upwardly from the conveyor to transport the boards along the conveyor. The lugs are adapted to continue driving the board forwardly even as it is being elevated from the table by the rotation of the inverter. The invention further comprises a conveyor having an inverter mounted to its frame.

13 Claims, 3 Drawing Sheets

BOARD INVERTER FOR USE IN LUMBER PROCESSING MACHINE

This is a divisional application of co-pending U.S. application Ser. No. 08/026,768, filed Mar. 5, 1993 U.S. Pat. No. 5,412,220.

FIELD OF THE INVENTION

The present invention relates to a device for inverting boards as they are transported in a lateral orientation along a conveyor within a lumber processing machine, such as an optical scanner.

BACKGROUND OF THE INVENTION

The processing of lumber in modern sawmills requires the sawn boards to be transported on conveyors and, for some purposes, to be rotated while on the conveyor such that an unexposed lower face is inverted. For example, the optical scanning device disclosed in the present inventor's U.S. Pat. No. 5,412,220 provides two banks of scanners positioned above a conveyor, with the boards being processed by the scanner being rotated by 180 degrees about their longitudinal axes between the banks. Thus, the two banks are able to scan all four lateral faces of each board, without the need for any scanners to be positioned below the conveyor. For this and similar purposes, it is necessary to provide a means to rapidly and accurately invert lumber as it is transported along a conveyor.

Various means exist to invert boards and other objects being transported on conveyors. For example, U.S. Pat. No. 4,484,675 (Doherty et al.) discloses a board inverter that employs a pivot-mounted curved arm driven by a hydraulic cylinder. Upward movement of the arm inverts each board as it travels along the conveyor. Other patents that disclose board-turning devices include U.S. Pat. Nos. 3,887,066 (Houtsager); 4,029,196 (Eckholm); 4,936,437 (Gearhart). In these devices, actuation of the device typically requires a motor or other such drive means, such as the hydraulic cylinder of Doherty et al. These prior art devices are correspondingly complex to make, operate and repair, subject to periodic breakdowns, and may experience difficulty in operating at a sufficiently high speed to accommodate the high conveyor speeds of modern processing mills.

In order to provide a simple board inverter that is capable of operating at essentially any conveyor speed, it is desirable to utilize the forward motion of the boards themselves as the motive force to invert the boards. This eliminates the need for external drive means, with their attendant expense, complications, control requirements and speed limitations. In a simple such system, a rotating wheel receives boards as they travel along the conveyor, inverts each board, and replaces it on the conveyor, with the wheel being driven by the movement of the boards along the conveyor.

SUMMARY OF THE INVENTION

The object of the present invention is to achieve a rotary board inverter for use in a conveyor for a lumber processing machine, wherein the motive force to invert the boards is provided by the forward motion of the boards themselves as they are transported along the conveyor. The board inverter of the present invention is adapted for use in association with a conveyor apparatus of the type that transports individual boards oriented in a lateral position relative to the direction of travel, from an upstream end to a downstream end of the conveyor at regular intervals along the conveyor, by way of board transport means. The invention further comprises a conveyor having a board inverting apparatus incorporated therein.

The board inverter comprises a rotatable hub with regularly spaced, co-planar arms radiating outwardly from the hub. The hub is mountable to the frame of a conveyor table such that the arms upon rotation extend upwardly above the level of the table. Each of the arms is provided with board retainer means adapted to sequentially receive boards from the boards transport means of the conveyor; to releasably retain a board as the arm rotates about the hub; and to redeposit the now-inverted board on the conveyor downstream of the inverter. Rotation of the device is driven by the forward movement of the boards as they sequentially engage the inverter. The board retainer means may comprise a slot recessed into an edge of the arm, with the slot being shaped to retain a board that is inserted edge-on into the slot.

Forward motion of the board along the conveyor engages the board with the board retainer means; where the retainer means comprises a slot, the board is driven into the slot by the forward motion of the conveyor. The inverter is particularly adapted for use in a conveyor having an array of evenly spaced, longitudinally-displaceable lugs extending upwardly from the conveyor to transport the boards along the conveyor. The lugs are adapted to continue driving the board forwardly even as it is being elevated from the table by the rotation of the inverter.

The inverter is preferably adapted to support a broad face of a board engaged by the inverter. This may be accomplished by providing a device wherein the arms comprise elongate members each having first and second opposing longitudinal edges. The board retainer means is incorporated into the first edge of each arm and the second edge comprises a generally flat surface facing the board retainer means of an adjacent arm. For example, where four equally spaced arms are provided, the first edge of a first arm merges with the second edge of a second, adjacent arm at a ninety degree angle. The second edge is adapted to contact a face of a board and cooperate with the board retainer means of an adjacent arm to releasably retain and support the board. Where the engagement means comprises a slot recessed into the base of each arm, one wall of the slot may comprise the second edge of an adjacent arm.

Since the inverter is rotatably driven by the forward movement of boards along the conveyor, the rotational speed of the inverter will equal the linear speed of the boards; the inverter is thus always in sync with the conveyor and will invert each board that travels along the conveyor table.

A conveyor according to the present invention is provided with an inverter mounted to the conveyor table such that the arms of the inverter when rotated extend at least partly above the table, and an array of regularly-spaced, longitudinally-displaceable lugs for driving a series of boards along the conveyor table, with the lugs in turn being driven along the table by drive means such as a chain, belt or the like operatively linked to a motor. Each of the lugs is provided with a forward face positioned to contact a face of a board and push the board along the table, into the retainer means of the inverter. The forward face of each lug is generally plow-shaped to permit the lug to drive a board that has been engaged by the inverter forwardly and upwardly. The forward face may as well have a concave profile to enable it to more closely reproduce the circular path followed by the board as it rotates about the inverter.

The board retainer means of the inverter have a regular circumferential spacing, equal to the linear spacing between the lugs of the conveyor.

It will be understood that references herein to the directional indications "upper", "lower", "forward", "rearward", and the like, are in reference to the normal operating position of a conveyor and inverter in a normal operating position, with the table positioned horizontally. The directions "forward" and "rearward" are relative to the direction of travel of lumber transported through the device.

DETAILED DESCRIPTION OF THE PREFERRED EMBODIMENT

Figure 1:
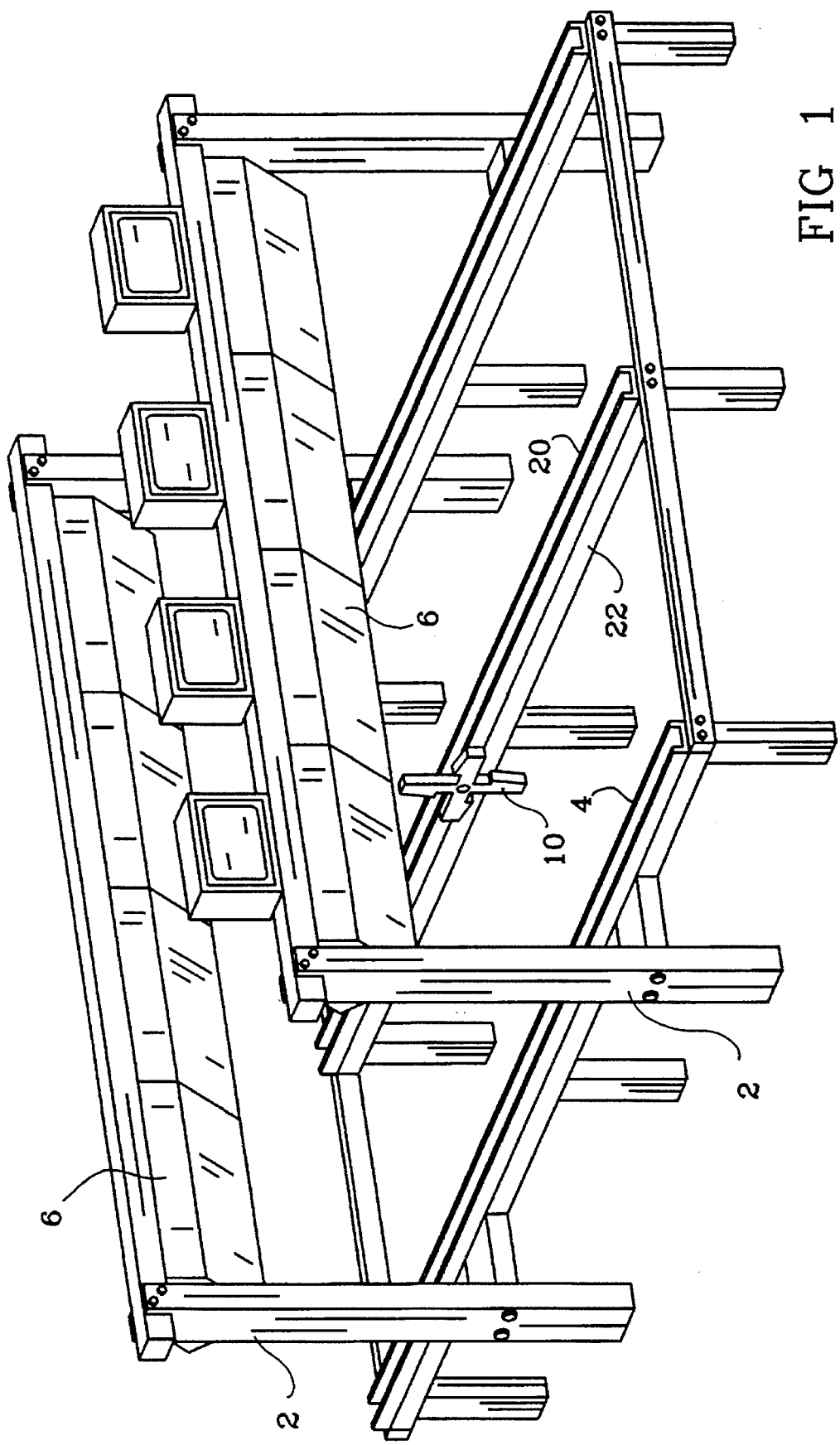
FIG. 1 is a perspective view of a lumber conveyor, showing lumber scanning means mounted thereto, with the chain drive portion removed and a board inverter mounted to the frame of the conveyor.
Figure 2:
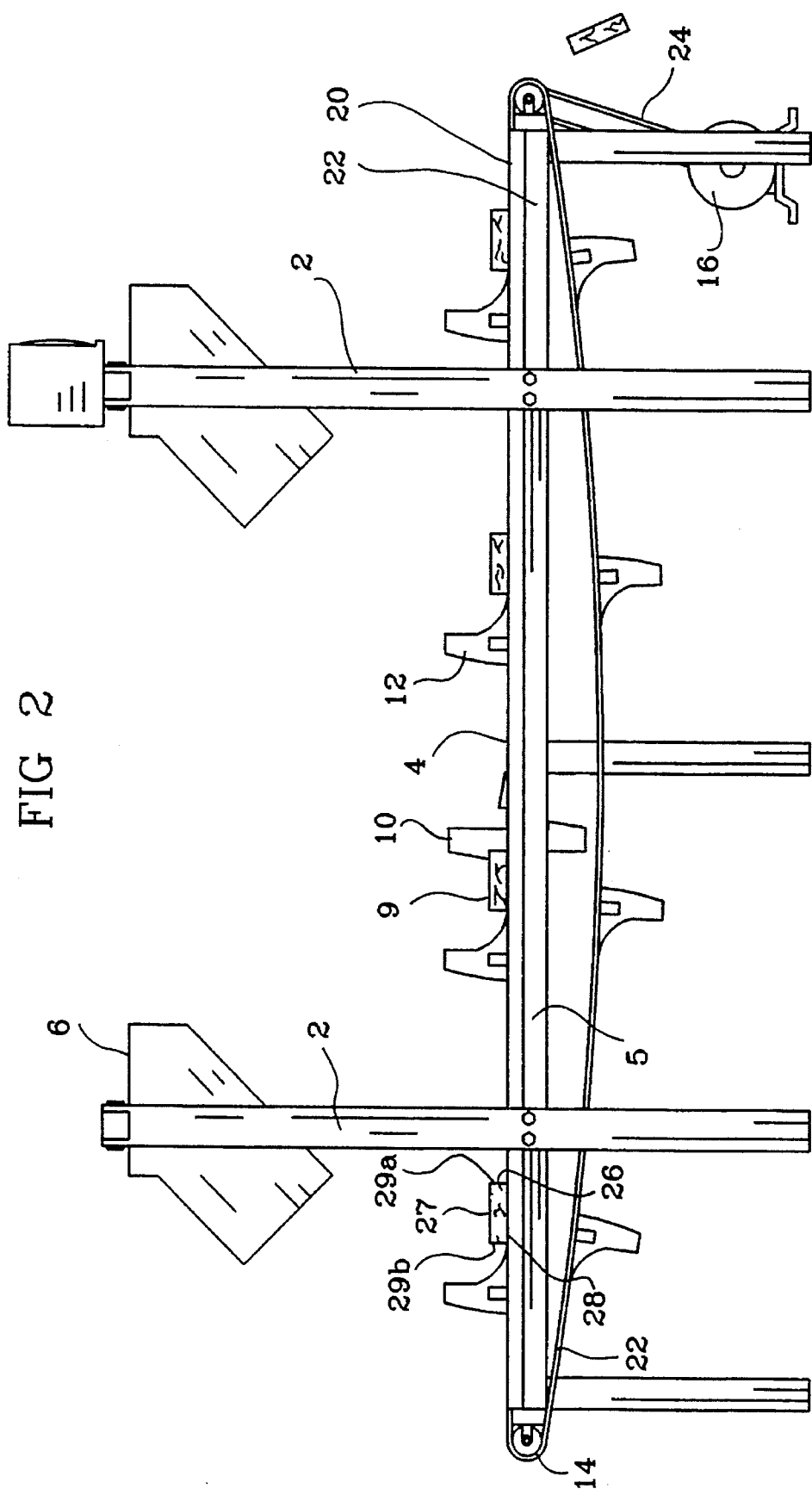
FIG. 2 is a side elevational view of the device as shown in FIG. 1.

The board inverter of the preferred embodiment is illustrated herein installed in an optical scanner for use in a sawmill. The scanner is illustrated in FIGS. 1 and 2 and comprises, in brief, a frame 2 that supports a board conveyor 4 and two banks of optical scanning units 6 positioned above the conveyor. The scanning units are designed to scan the upper and forward faces of individual boards 9 as they are transported in a transverse orientation along the conveyor. The board inverter 10 is positioned midway between the scanner banks, and permits the second bank to scan the board faces previously hidden to the initial scanner bank. As seen in FIG. 2, the boards are transported along the conveyor by means of an array of lugs 12. The lugs are linked to an array of drive chains 14, driven by a motor 16 and operatively linked to the chain by an array of belts and pulleys. The chains each travel in a corresponding trough 20, supported in turn by a beam 22. The troughs and beams collectively comprise a conveyor table, along which the boards are transported from an upstream end to a downstream end (from left to right in FIG. 2). After the boards reach the downstream end of the conveyor, they may be received by a further processing unit, not shown, such as a trimming saw.

For purposes of reference each board 9 will be described as having an upper face 27, a lower face 28, and forward and rearward lateral faces 29 (a) and (b), respectively, relative to the position of the board when placed on its side on the intake end of the conveyor.

The lugs 12 cooperate with the board inverter to invert each board as it is transported along the conveyor. Accordingly, the spacing of the lugs along the chain is important, as will be discussed below.

Figure 3:
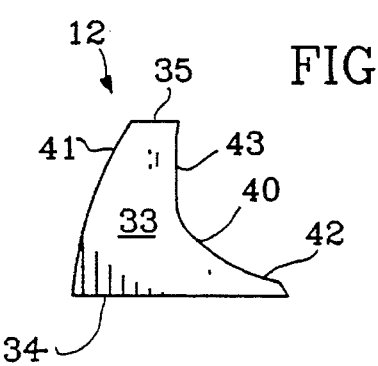
FIG. 3 is a side elevational view of a board engagement lug of the conveyor.

Referring to FIG. 3, each lug 12 comprises a generally plate-like structure having flat sides 33; a flat horizontal base 34 and top 35; and leading and trailing faces 40 and 41, respectively. When positioned within the trough, the leading face of the lug faces downstream of the conveyor and contacts a corresponding board 9. The leading face is generally concave and plow-shaped, when viewed from the side, with a lower portion 42 sloping upwardly and rearwardly at a relatively shallow angle relative to the base, merging with a slightly curved, generally vertical upper portion 43, having a slight forward lean at its upper end. The configuration of the forward face is adapted to retain a board driven across the grading table, and to cooperate with the board inverter to rotate the board about its longitudinal axis. The concave profile permits the lug to better follow the circular path described by a board as it is rotated about the inverter. The configuration of the trailing face of the lug does not affect the operation of the device.

Figure 4:
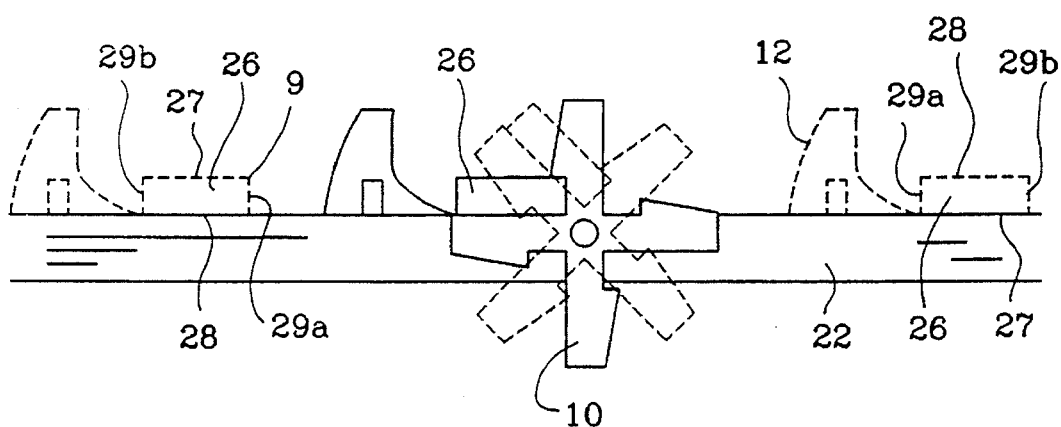
FIG. 4 is a side elevational view of the inverter and a portion of the conveyor.
Figure 5:
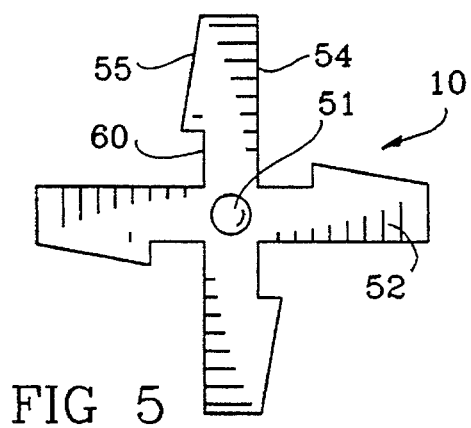
FIG. 5 is a side elevational view of the inverter.

Referring to FIGS. 4 and 5, one or more board inverters 10 are mounted to at least one of the beams 22, intermediate between the banks of scanners 6 (seen in FIGS. 1 and 2) and partway between the upstream and downstream ends of the conveyor. The board inverters are adapted to rotate each board being transported along the conveyor by 180 degrees about its longitudinal axis, in order to position what was previously the lower face 28 of the board such that it faces upwardly. Where the conveyor is adapted for use with boards longer than 12 feet, two inverters may be provided for additional support of the boards. The inverter 10 comprises a generally planar structure, freely rotatable about a central hub 51 mounted to a beam 22. The inverter has four arms 52 extending radially outwardly at right angles from each other. The arms each extend above the conveyor table when the arm is in the upright position. Each arm has a leading face 54 and a trailing face 55, with the leading face being oriented towards the usual direction of rotation of the arm and the trailing face facing the upstream end of the conveyor when the arm is in the upwardly-extending position. The leading face 54 is generally flat and vertical when the arm is oriented upwardly. The trailing face has a notch 60 recessed into its base, one wall of the notch being comprised of the base of the leading face of an adjacent arm. The notch comprises board retaining means adapted to releasably retain the boards as they are inverted by the device, as is described below.

As each board is pushed forwardly through the device by the lugs 12, its forward face 29 (a) contacts the notch 60 of an upwardly-extending first arm and is loosely engaged therein, as seen in FIG. 4. With further horizontal movement of the board being prevented by the notch 60, the plow-shaped lower portion of the lug lifts the board upwardly, at which point the lower face 28 of the board is contacted by the leading face 54 of an adjacent arm. Continued forward movement of the lug causes the inverter to pivot about its axis, as shown in the dotted lines in FIG. 4, lifting and inverting the board. After the board is fully inverted, it is deposited downstream of the inverter on the conveyor, at which point the lug re-engages the board for continued conveyance along the conveyor. Sequential engagement of the inverter by subsequent boards drives the inverter to rotate continuously.

In order for the lugs to properly place each board within a corresponding slot in the inverter, the lugs must be positioned along the conveyor such that spacing between the lugs equals the circumferential distance between the slots.

Although the present invention has been described by way of a preferred embodiment thereof, it will be obvious to those having ordinary skill in the art that variations to the preferred embodiment described above may be made without departing from the spirit and scope of the invention, as defined by the appended claims.

I claim:

1. A board inverter for use in association with a lumber conveyor, said conveyor having board transport means adapted to transport boards at regular intervals along said conveyor in a lateral orientation, said inverter comprising a rotatable hub mountable to said conveyor and having an array of regularly-spaced arms extending radially outwardly from said hub and extending at least partly above said conveyor when said inverter is mounted thereto and said arms are oriented upwardly, each of said arms having a base adjacent said hub, said arms each including board retainer means adapted to sequentially receive said boards from said board transport means, to releasably retain said boards as said arm rotates about said hub, and redeposit said board on said conveyor in an inverted position following said rotation, said inverter being adapted to be continuously rotatably driven by the sequential engagement of said boards with said board retainer means.

2. A device as claimed in claim 1 wherein said board retainer means comprises a slot recessed into each of said arms adapted to receive and releasably retain said board.

3. A device as claimed in claim 1, wherein said arms each comprise an elongate member having opposing longitudinal first and second edges, said board retainer means being positioned along said first edge, said second edge comprising a generally flat surface facing board retainer means of an adjacent arm, said second edge adapted to contact a face of said boards and cooperate with said board retainer means of said adjacent arm to releasably retain said board.

4. A device as claimed in claim 3, wherein said board retainer means comprises a generally square slot recessed into an edge of each said arms at the base of said arm, and wherein said second edge of an adjacent of said arms comprises a wall of said slot 5. A device as claimed in claim 3, wherein four of said arms are provided, regularly distributed about said hub.

6. A device as claimed in claim 1, wherein four of said arms are provided, regularly distributed about said hub.

7. A lumber conveyor for the transport of boards in a lateral orientation along said conveyor, said conveyor comprising an elongate transport table having upstream and downstream ends and a board inverter positioned partway between said upstream and downstream ends, said conveyor including an array of regularly-spaced longitudinally-displaceable board engagement lugs extending upwardly from said table and drive means to displace said lugs along said table from said upstream end to said downstream end, said lugs each having a forward face adapted to contact said boards as they are transported along said table from said upstream to said downstream ends, said forward face having a generally plow-shaped profile adapted to push a board engaged thereby forwardly and upwardly when said board contacts said board inverter, said board inverter comprising a rotatable hub mountable to said conveyor with an array of arms extending radially outwardly from said hub and extending at least partly above said table when oriented upwardly, each of said arms having a base adjacent said hub, said arms each including board retainer means adapted to sequentially receive said boards from said board transport means, to releasably retain said boards as said arm rotates about said hub, and to redeposit said board on said conveyor in an inverted position following said rotation, said board retainer means having a regular circumferential spacing relative to each other, equal to the linear spacing between said lugs, said inverter being adapted to be rotatably driven by the sequential engagement of said boards with said board retainer means.

8. A lumber conveyor as claimed in claim 7 wherein said board retainer means comprises a slot recessed into each of said arms adapted to receive and releasably retain said board.

9. A lumber conveyor as claimed in claim 7, wherein each of said arms is provided with a board engagement surface along an edge of said arm opposed to said board retainer means, said engagement surface adapted to engage a broad face of one of said boards and cooperate with said board retainer means of an adjacent of said arms to retain said board while said inverter is engaged in inverting said board.

10. A lumber conveyor as claimed in claim 9, wherein said board engagement surface comprises a generally flat edge of said arm, and said board retainer means comprises a generally square slot recessed into an edge of each said arms at the base of said arm.

11. A lumber conveyor as claimed in claim 7, wherein four of said arms are provided, regularly distributed about said hub.

12. A lumber conveyor as claimed in claim 7, wherein the board retainer means on said board inverter have a regular circumferential distance apart from each other and said lugs are spaced apart from each other by a distance equal to said circumferential distance.

13. A lumber conveyor as claimed in claim 7, wherein the forward face of each of said lugs is generally concave and is shaped to generally reproduce the circular path followed by a board engaged to said inverter.

\* \* \* \* \*